(12) United States Patent
Kim

(10) Patent No.: US 10,047,867 B2
(45) Date of Patent: Aug. 14, 2018

(54) LINE BLIND VALVE

(71) Applicant: BOXY BLIND VALVE CO., LTD., Miryang-si, Gyeongsangnam-do (KR)

(72) Inventor: Jung Yeon Kim, Busan (KR)

(73) Assignee: Boxy Blind Valve Co., Ltd. (KR)

( * ) Notice: Subject to any disclaimer, the term of this patent is extended or adjusted under 35 U.S.C. 154(b) by 0 days.

(21) Appl. No.: 15/617,162

(22) Filed: Jun. 8, 2017

(65) Prior Publication Data
US 2018/0180186 A1 Jun. 28, 2018

Related U.S. Application Data

(63) Continuation of application No. PCT/KR2016/015448, filed on Dec. 29, 2016.

(30) Foreign Application Priority Data

Dec. 26, 2016 (KR) ........................ 10-2016-0179341

(51) Int. Cl.
*F16K 3/20* (2006.01)
*F16K 3/312* (2006.01)
(Continued)

(52) U.S. Cl.
CPC ............ *F16K 3/312* (2013.01); *F16K 3/0281* (2013.01); *F16K 3/20* (2013.01); *F16K 31/44* (2013.01); *F16K 31/508* (2013.01); *F16K 31/60* (2013.01)

(58) Field of Classification Search
CPC . F16K 3/312; F16K 3/20; F16K 31/60; F16K 3/0281; F16K 31/508; F16K 31/44
(Continued)

(56) References Cited

U.S. PATENT DOCUMENTS 2,214,959 A * 9/1940 Hamer ...................... F16K 3/20
251/328
2,278,848 A * 4/1942 Hamer .................... F16K 3/312
251/159
(Continued)

FOREIGN PATENT DOCUMENTS

KR 20-0288608 Y1 9/2002
KR 10-1535661 B1 7/2015
(Continued)

OTHER PUBLICATIONS

BOXY EX Type [retrieved on Dec. 26, 2016]. Retrieved from the internet: <URL: http://boxyblindvalve.com/new/sub03/sub03_04.html>.
(Continued)

*Primary Examiner* — John Bastianelli
(74) *Attorney, Agent, or Firm* — Park & Associates IP Law, P.C.

(57) ABSTRACT

A line blind valve includes: a valve body formed with an opening at each of a front side and a rear side thereof; a fixed pipe fixedly provided on the front side to be in a shape inserted in the opening of the front side; a moving pipe provided on the rear side by being inserted into the opening of the rear side, and movable in a direction of a pipeline, with threads formed on an outer circumferential surface thereof; a blind provided between the fixed pipe and the moving pipe to open or block the pipeline by moving upward or downward; and a drive assembly including a gear set engaged with the threads and configured to press the moving pipe toward the blind to sealingly fix the moving pipe, and a drive unit coupled to the gear set to control a rotation direction of the gear set.

3 Claims, 6 Drawing Sheets

(51) Int. Cl.
   *F16K 3/02*     (2006.01)
   *F16K 31/50*    (2006.01)
   *F16K 31/60*    (2006.01)
   *F16K 31/44*    (2006.01)

(58) Field of Classification Search
   USPC ............... 138/94.3; 251/159, 193–194, 328
   See application file for complete search history.

(56) References Cited

U.S. PATENT DOCUMENTS

| | | | | |
|---|---|---|---|---|
| 2,558,247 | A * | 6/1951 | Hamer | F16K 3/312 |
| | | | | 138/94.3 |
| 2,664,918 | A * | 1/1954 | Hamer | F16K 3/20 |
| | | | | 138/94.3 |
| 2,709,455 | A | 5/1955 | Greenwood | |
| 2,815,771 | A * | 12/1957 | Gibbs | F16K 3/312 |
| | | | | 138/94.3 |
| 3,187,776 | A * | 6/1965 | Snell, Jr. | F16K 3/312 |
| | | | | 138/94.3 |
| 4,343,332 | A * | 8/1982 | Williams, III | F16L 55/105 |
| | | | | 138/94.3 |
| 8,567,447 | B2 * | 10/2013 | Montoya Trevino | B21D 39/048 |
| | | | | 138/94.3 |

FOREIGN PATENT DOCUMENTS

KR   10-1541459 B1   8/2015
KR   10-1558267 B1   10/2015

OTHER PUBLICATIONS

Korean Office Action (KR 10-2016-0179341), KIPO, dated Apr. 12, 2018.
International Search Report (PCT/KR2016/015448), PCT/ISA, dated Sep. 12, 2017.

* cited by examiner

LINE BLIND VALVE

REFERENCE TO RELATED APPLICATIONS

This is a continuation of pending International Patent Application PCT/KR2016/015448 filed on Dec. 29, 2016, which designates the United States and claims priority of Korean Patent Application No. 10-2016-0179341 filed on Dec. 26, 2016, the entire contents of which are incorporated herein by reference.

FIELD OF THE INVENTION

The present invention relates generally to a line blind valve. More particularly, the present invention relates to a line blind valve, which enables opening and blocking a blind with ease and sealing the blind with a simple structure.

BACKGROUND OF THE INVENTION

Generally, a line blind valve is provided at a boundary of a hydrostatic tester of the piping to block and open the fluid flow in the piping. In the case of connecting pipes, in which different types of fluids flow, it is provided to prevent the fluids from being introduced to each other or to prevent the fluids from being mixed with each other.

A conventional blind valve, as shown in FIG. 1 is a valve installed between pipes to open or block a pipeline, and includes: a valve body 10 having opening portions 11 and 12 formed at front and rear sides thereof, respectively; a front sheet 15 formed from the opening portion 11 of the front side toward an inside of the valve body 10, and a rear sheet 16 formed from the opening portion 12 of the rear side toward the inside of the valve body 10; a blind plate 20 being provided between the front sheet 15 and the rear sheet 16 and including an opening member 21 formed with an opening to open the pipeline, and a blocking member 22 provided at an upper portion of the opening member 21 to block the pipeline; a moving shaft rotating by being geared to a surface of the blind plate 20 to move the blind plate 20 up and down, thereby opening and blocking the pipeline; and a gear unit 40 configured such that a ring gear 41 engaged with the rear sheet 16 moves forward to press a ring sheet 42, whereby the ring sheet 42 presses the blind plate 20 toward the front sheet 15 to sealingly fix the same.

Here, to bring the blind plate 20 into close contact with the valve body 10, the gear unit 40 is operated such that the ring sheet 42 pushes the blind plate 20 toward the front sheet 15, which requires a complicated structure, so manufacturing cost is high due to a variety of components, and the blind plate is sealed with a complicated structure.

Herein, the ring sheet 42 should come into close contact with not only the blind plate 20 but also the rear sheet 16, and the ring sheet is configured to move to an outer circumferential surface of the rear sheet such that mutual sealing is ensured, thereby resulting in complexity of coupling and configuration.

Accordingly, it is necessary to develop a blind valve that can solve the above problems.

SUMMARY OF THE INVENTION

Accordingly, the present invention has been made keeping in mind the above problems occurring in the prior art, and an object of the present invention is to provide a line blind valve, which capable of sealing a blind by close contact using a simple structure and has a structure configured to be easily spaced apart from the blind.

In order to accomplish the above object, the present invention provides a line blind valve including: a valve body formed with an opening at each of a front side and a rear side thereof; a fixed pipe fixedly provided on the front side to be in a shape inserted in the opening of the front side; a moving pipe provided on the rear side by being inserted into the opening of the rear side, and movable in a direction of a pipeline, with threads formed on an outer circumferential surface thereof; a blind insertedly provided between the fixed pipe and the moving pipe to open or block the pipeline by moving upward or downward; and a drive assembly including a gear set engaged with the threads of the moving pipe and configured to press the moving pipe toward the blind by a rotation thereof so as to sealingly fix the moving pipe, and a drive unit coupled to an upper portion of the gear set so as to control a rotation direction of the gear set.

The gear set may include: a ring gear engaged with the outer circumferential surface of the moving pipe, and provided with threads on an inner surface thereof; and a lever provided at a top of the ring gear and connected to the drive unit.

The drive unit may include: a worm gear connected to a handle; a screw shaft rotating in conjunction with the worm gear; and a moving nut moving forward and backward by being engaged with the screw shaft, with a lower portion thereof coupled to the lever.

The fixed pipe may be integrally provided on the valve body.

According to the present invention configured as described above, the following effect can be expected.

Since a moving pipe allows a structure configured to seal a blind by coming into close contact with or being spaced apart from the blind inside a valve body to move in the pipeline, it is possible to seal the blind by using a simple structure

DETAILED DESCRIPTION OF THE INVENTION

Hereinbelow, an exemplary embodiment of the present invention will be described in detail with reference to the accompanying drawings.

Figure 2:
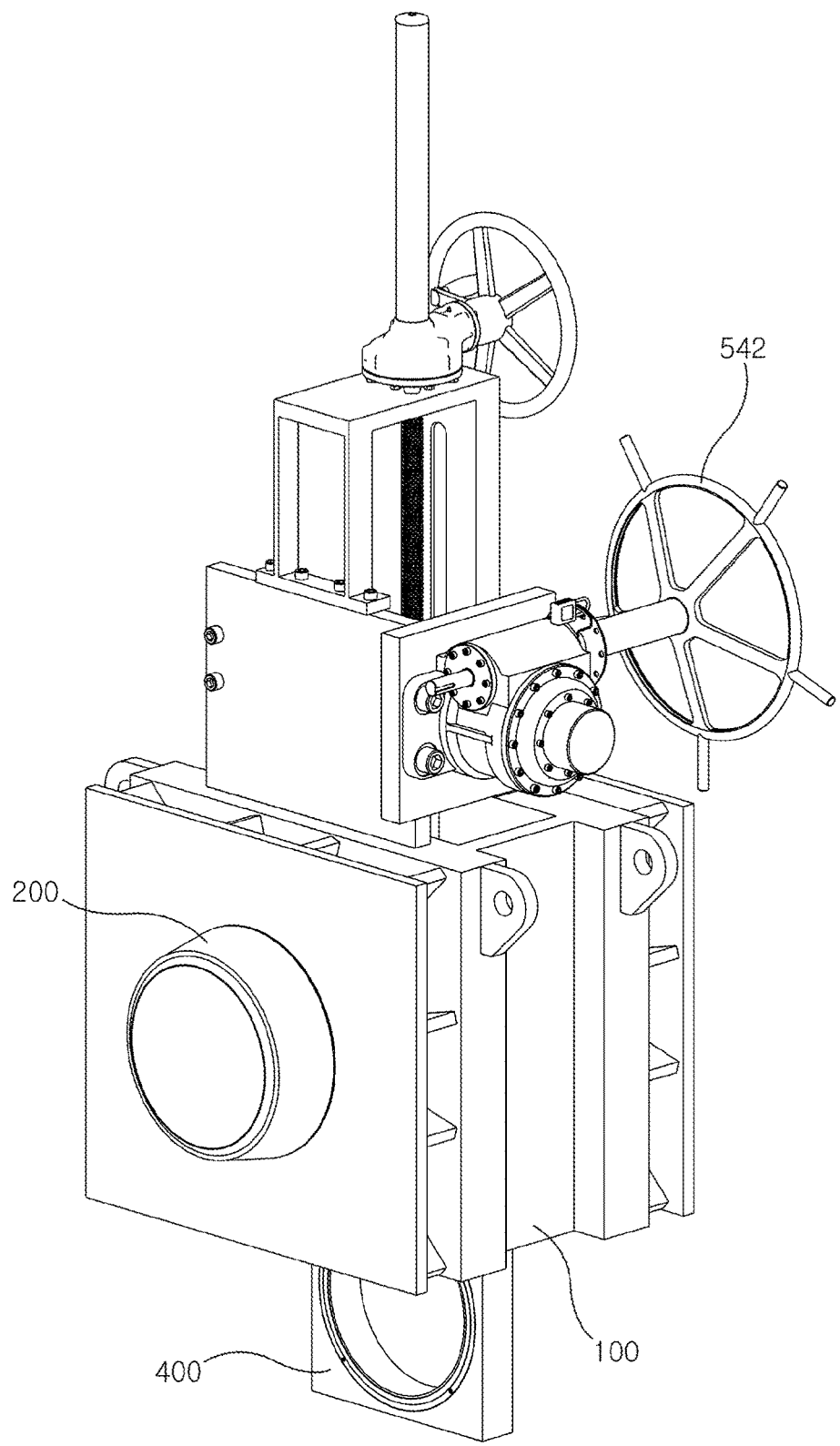
FIG. 2 is a perspective view showing a line blind valve according to an embodiment of the present invention.
Figure 3:
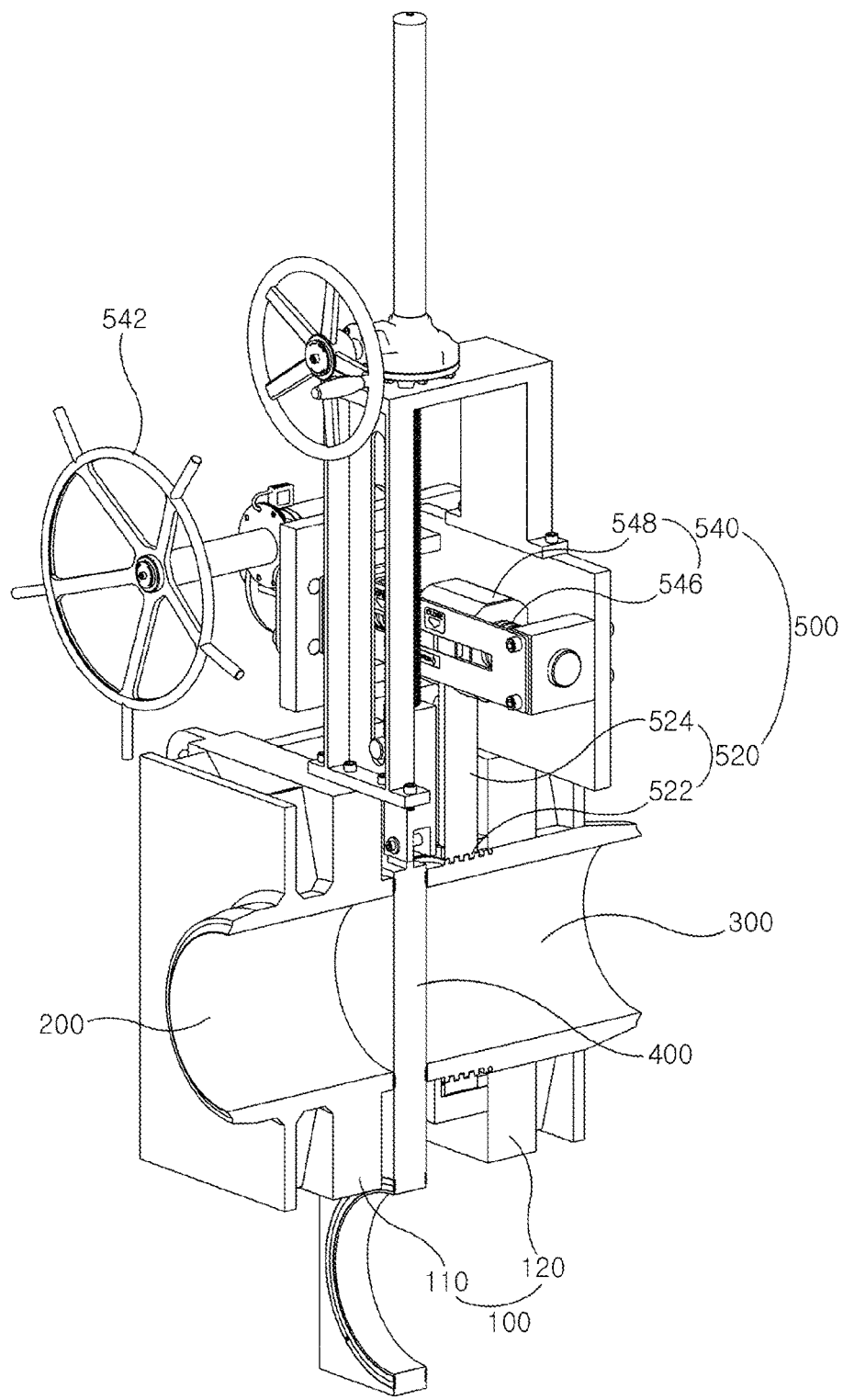
FIG. 3 is an internal diagram of FIG. 2.

FIG. 2 is a perspective view showing a line blind valve according to an embodiment of the present invention; and FIG. 3 is an internal diagram of FIG. 2.

Referring to FIG. 3, a line blind valve, as the present invention, includes a valve body 100, a fixed pipe 200, a moving pipe 300, a blind 400, and a drive assembly 500.

Figure 1:
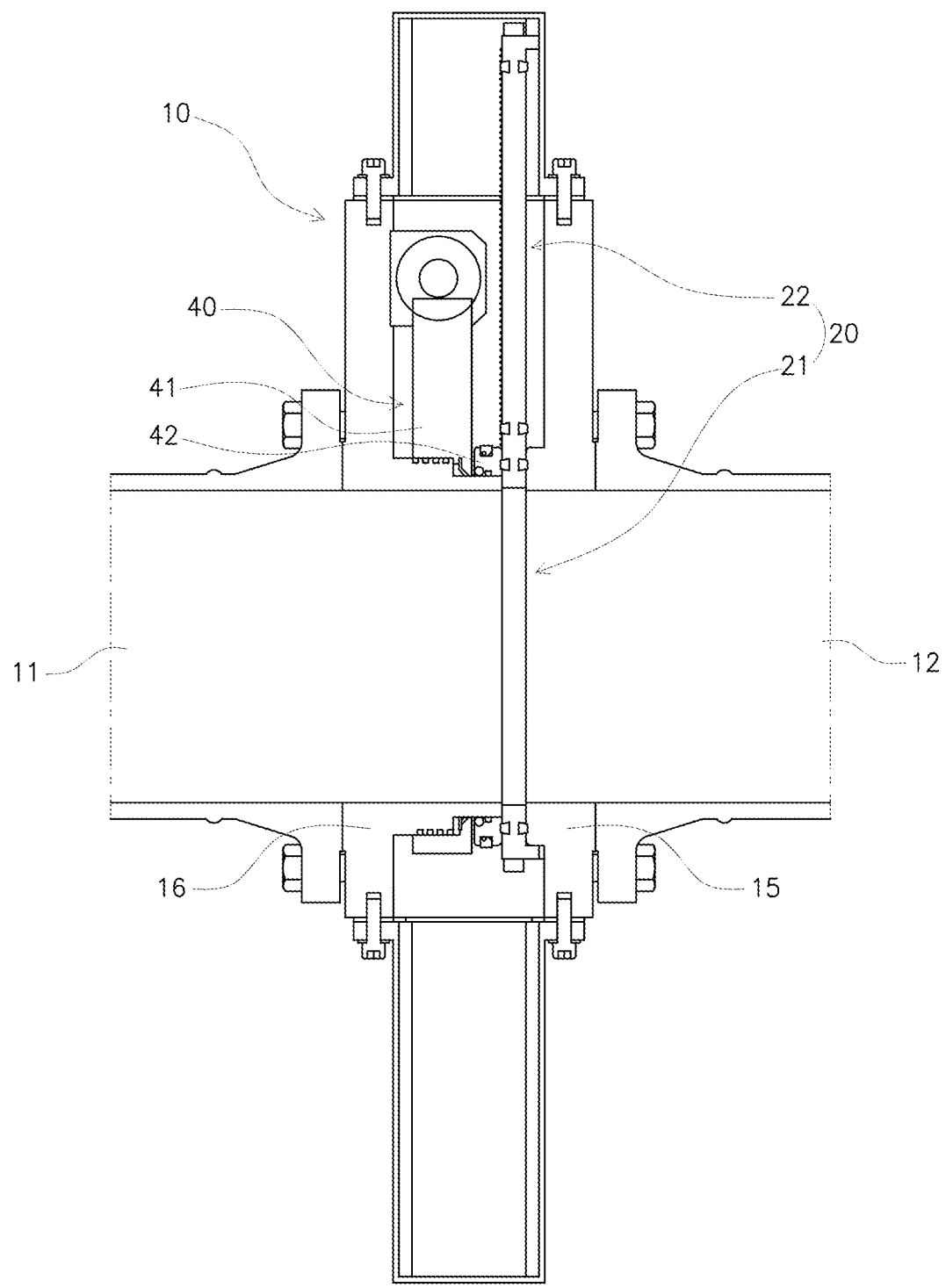
FIG. 1 is a diagram showing a conventional line blind valve.

The valve body 100 corresponds to an appearance of the valve, and is formed in a box shape as shown in FIG. 1.

The valve body 100 is provided between pipes with the blind 400 insertedly provided thereinto, so as to open or block pipeline.

The valve body 100 includes a front flange 110 formed with a front opening, and a rear flange 120 formed with a rear opening for connecting pipelines, and the blind 300 is disposed therebetween.

The fixed pipe 200 serves to support a front side of the blind 400 from the front opening of the valve body 100, and is formed in a pipe shape inserted in the front opening of the valve body 100. Here, the fixed pipe 200 is integrally formed in the front flange 110 of the valve body 100, 110 and is fixed thereto.

The moving pipe 300 serves to support a rear side of the blind 400, and is formed in a pipe shape inserted in the rear opening of the valve body 100.

Here, the moving pipe 300 is inserted into the rear opening to be movable toward the pipeline. Further, an outer circumferential of the moving pipe 300 is formed with threads 320, and thanks to the threads 320 in FIG. 4, the moving pipe 300 can be moved toward the pipeline in conjunction with operation of the drive assembly 500.

The fixed pipe 200 and the moving pipe 300 are parts that are inserted into the inside of the valve body 100 to come into close contact with the blind 400. The fixed pipe 200 is fixed, and the moving pipe 300 is configured to move to the rear opening of the valve body 100 to come into close contact with the blind 400.

The blind 400 is provided between the fixed pipe 200 and the moving pipe 300 to open or block the pipeline by moving upward or downward.

The blind 400 is formed in a plate shape, and is configured such that an upper portion thereof is a closing blind since it is used to block the pipeline, and a lower portion thereof is an opening blind since it is formed with a communication hole that has a size corresponding to a size of the pipeline so as to enable communication therebetween.

The blind 400 is opened by being moved upwards and is closed by being moved down, and the fixed pipe 200 and the moving pipe 300 come into close contact with the front and rear sides of the blind 400 respectively, so as to prevent fluid leakage.

Further, when the blind 400 is moved, to facilitate movement, the moving pipe 300 should be spaced apart from the blind, and the moving pipe 300 is operated by the drive assembly 500.

The drive assembly 500 includes a gear set 520 that is engaged with the threads of the moving pipe 300 and is configured to press the moving pipe 300 toward the blind 400 by a rotation thereof so as to sealingly fix the moving pipe 300, and a drive unit 540 that is coupled to an upper portion of the gear set 520 so as to control a rotation direction of the gear set 520.

Figure 4:
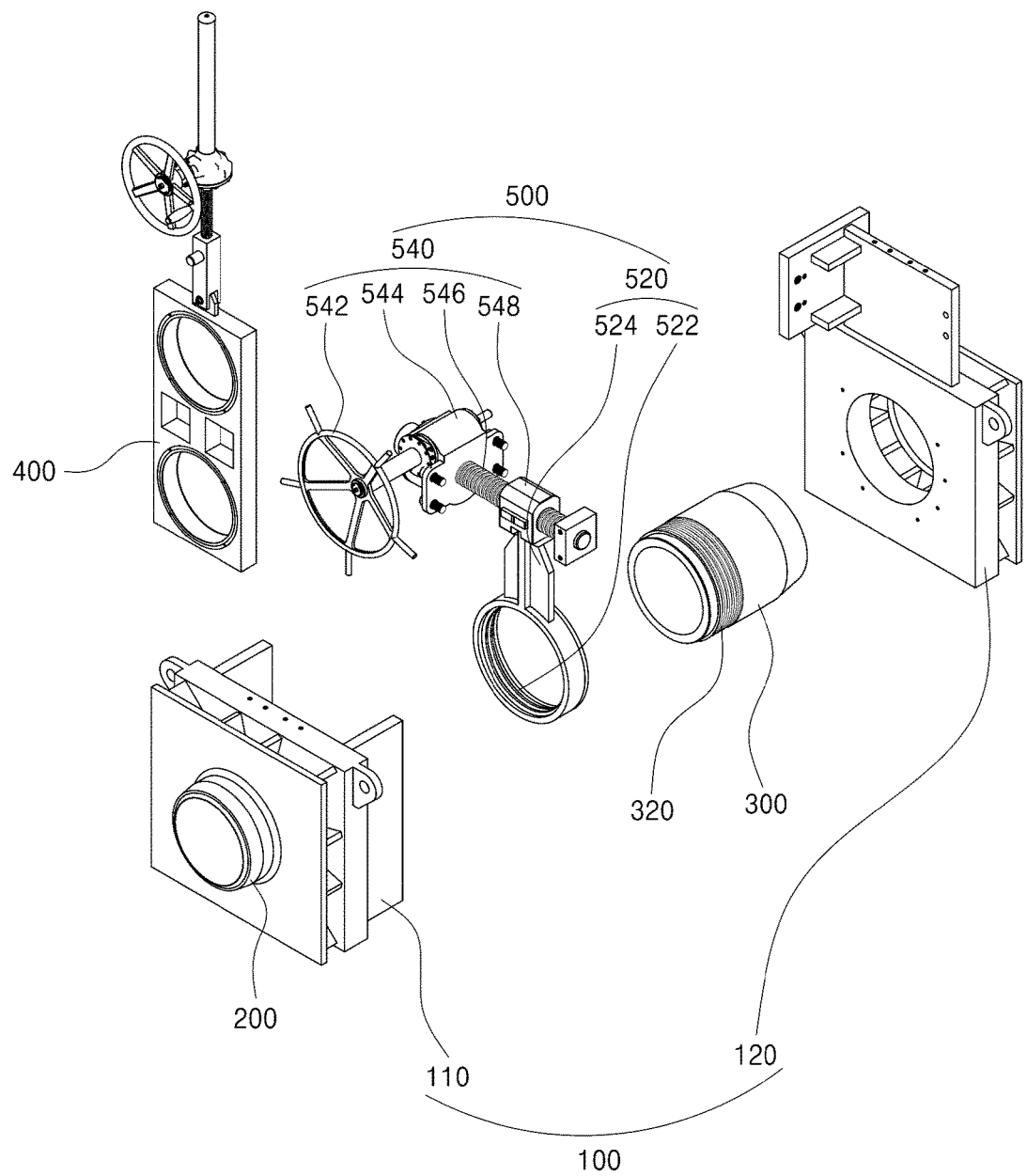
FIG. 4 is an exploded perspective view showing the line blind valve.

FIG. 4 is an exploded perspective view showing the line blind valve.

Referring to FIG. 4, the gear set 520 includes: a ring gear 522 engaged with the outer circumferential surface of the moving pipe, and provided with threads on an inner surface thereof; and a lever 524 provided at a top of the ring gear 522 to be connected to the drive unit 540.

The drive unit 540 includes: a worm gear 544 connected to a handle 542; a screw shaft 546 rotating in conjunction with the worm gear 544; and a moving nut 548 moving forward and backward by being engaged with the screw shaft 546, with a lower portion thereof coupled to the lever 524.

In other words, according to a rotation direction of the handle 542, the moving nut 548 moves along the screw shaft 546, and the moving pipe 300 engaged with the ring gear 522 is moved forward and backward by rotating the lever 524 connected to the moving nut by a predetermined angle.

Figure 5:
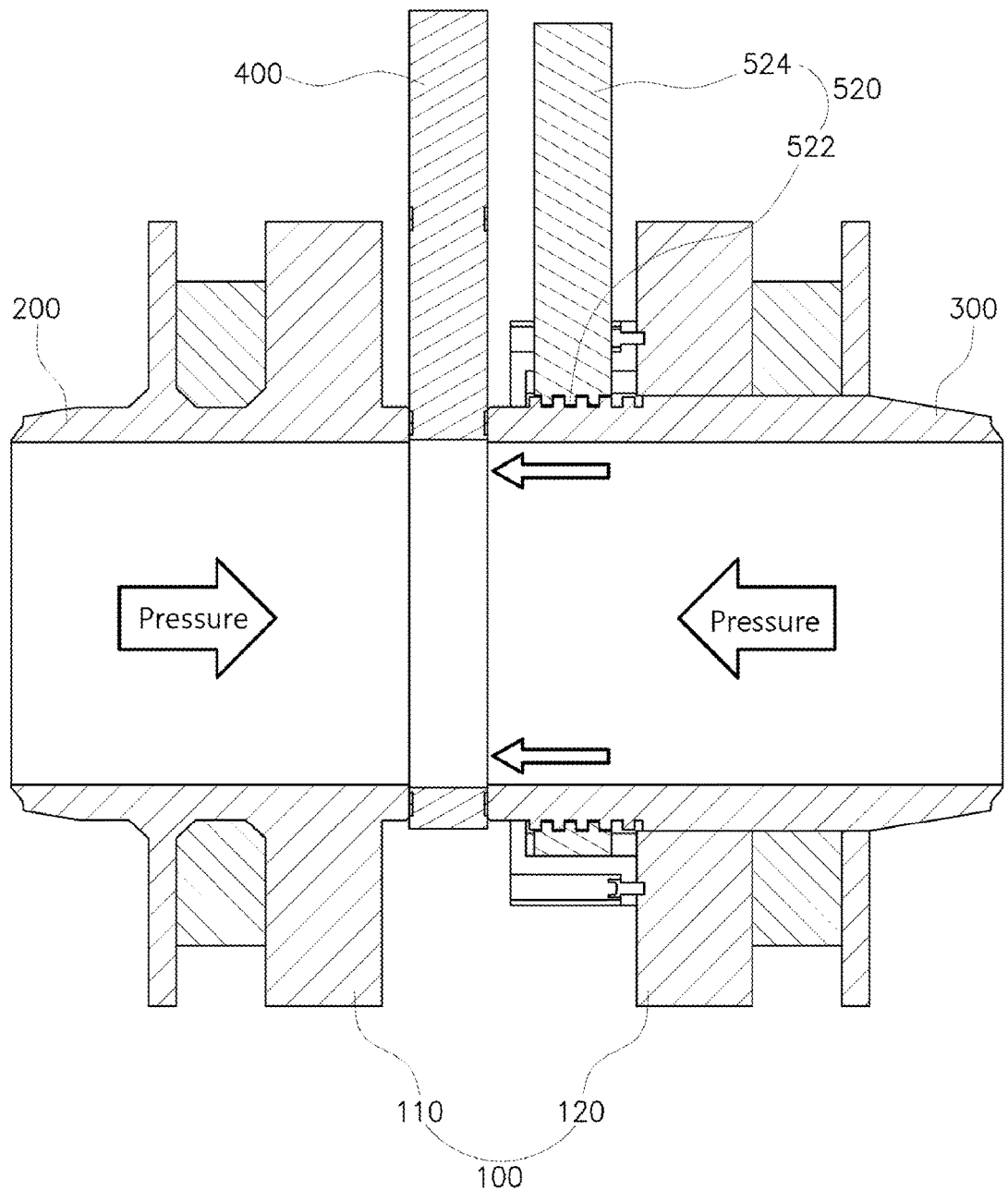
FIG. 5 is a view showing a state where a moving pipe comes into close contact with a blind by moving forward in the line blind valve.
Figure 6:
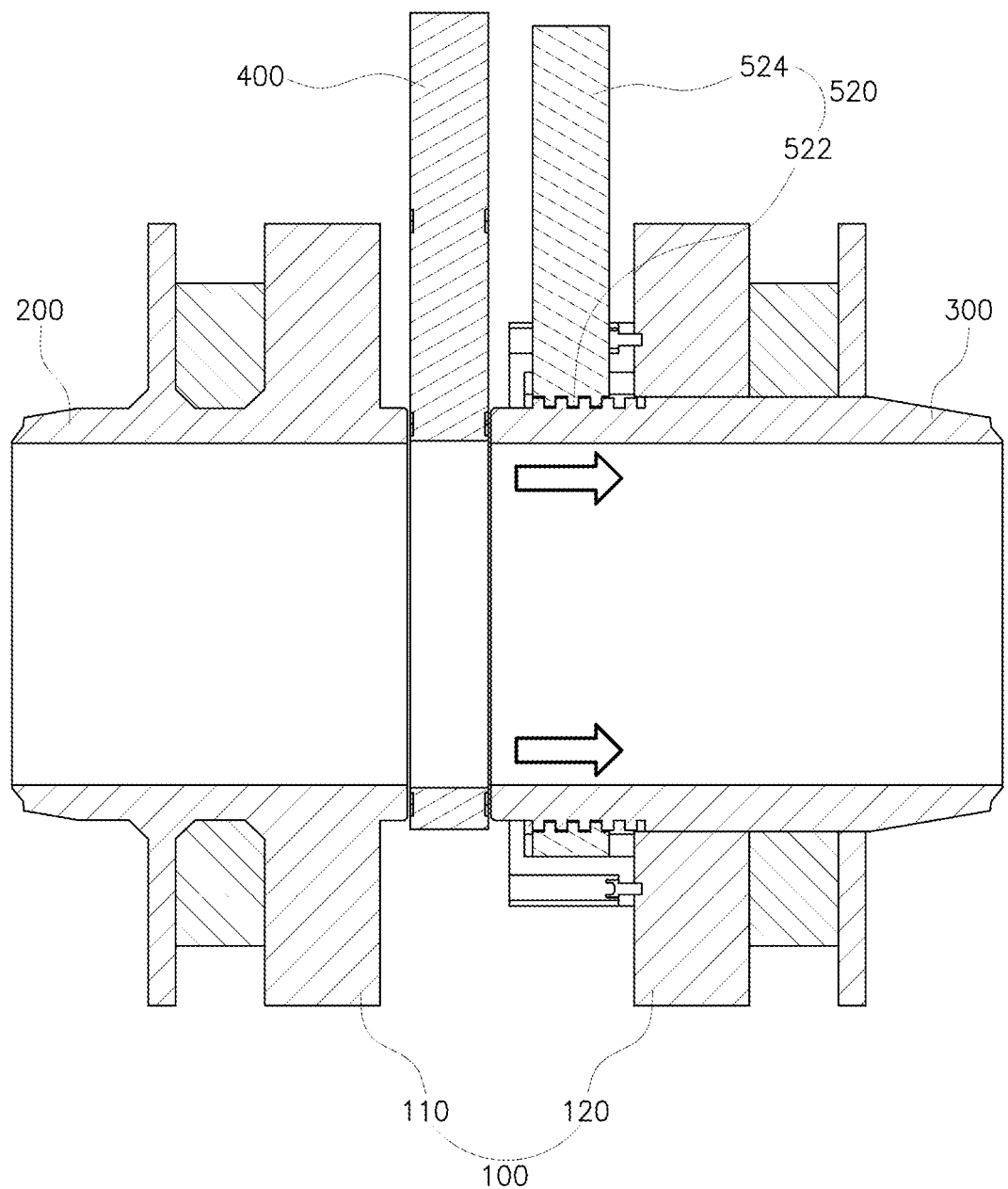
FIG. 6 is a view showing a state where the moving pipe is spaced apart from the blind by moving backward in the line blind valve.

FIG. 5 is a view showing a state where a moving pipe comes into close contact with a blind 400 by moving forward in the line blind valve; and FIG. 6 is a view showing a state where the moving pipe is spaced apart from the blind 400 by moving backward in the line blind valve.

Referring to FIG. 5, it is shown that the blind 400 is opened such that the pipeline communicates with opposite sides thereof. Here, the gear set 520 is configured to rotate by a predetermined angle such that the moving pipe 300 moves forward toward the blind 400 to come into close contact with the same.

Referring to FIG. 6, when the gear set 520 rotates reversely, the moving pipe 300 moves backward from the blind 400 to be spaced apart therefrom. Here, since the blind 400 can be freely moved up and down, it is possible to switch to a state where the blind 400 is blocked.

Accordingly, the present invention is capable of simply sealing the blind without an additional sheet by using a coupling structure that is configured such that the moving pipe 300 comes into close contact with or is spaced apart from the blind in the pipeline.

It is understood by those skilled in the art that the foregoing description is a preferred embodiment of the line blind valve and that various changes and modifications may be made in the invention without departing from the spirit and scope thereof.

The present invention relates to a line blind valve, which can be applied to the field of line blind valves that facilitate opening and blocking a blind and is capable of sealing the blind with a simple structure.

What is claimed is:
1. A line blind valve comprising:
a valve body (100) having an opening at each of a front side and a rear side thereof;
a fixed pipe (200) fixedly provided on the front side and inserted in the opening of the front side;
a moving pipe (300) provided on the rear side and inserted in the opening of the rear side, and movable in a direction of a pipeline, with threads (320) formed on an outer circumferential surface thereof;
a blind (400) movably provided between the fixed pipe (200) and the moving pipe (300) to open or block the pipeline by moving upward or downward; and
a drive assembly (500) including a gear set (520) engaged with the threads of the moving pipe (300) and configured to press the moving pipe (300) toward the blind (400) by an operation thereof so as to sealingly fix the moving pipe, and a drive unit (540) coupled to an upper portion of the gear set (520) so as to control a rotation direction of the gear set (520),
wherein the gear set (520) includes: a ring gear (522) engaged with the outer circumferential surface of the moving pipe, and having threads on an inner surface thereof; and a lever (524) provided at a top of the ring gear (522) and connected to the drive unit (540),
wherein the drive unit (540) includes: a worm gear (544) connected to a handle (542); a screw shaft (546) rotating in conjunction with the worm gear (544); and a moving nut (548) moving forward and backward by being engaged with the screw shaft (546), with a lower portion thereof coupled to the lever (524).

2. The line blind valve of claim 1, wherein the fixed pipe (200) is integrally provided on the valve body (100).

3. The line blind valve of claim 1, wherein the valve body (100) includes a front flange (110) to which the fixed pipe (200) is fixed, and a rear flange (120) to which the moving pipe (300) is inserted.

\* \* \* \* \*